(12) United States Patent
Beatty et al.

(10) Patent No.: US 6,366,426 B1
(45) Date of Patent: Apr. 2, 2002

(54) APPARATUS AND METHOD FOR REDUCING STRUCTURAL VIBRATIONS IN A DISC DRIVE UTILIZING FUSIBLE ALLOYS

(75) Inventors: Paul A. Beatty, Longmont; David A. Olivero, Boulder; Walter Wong, Boulder; Patrick M. Thomas, Boulder; James M. Murphy, Boulder, all of CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/505,572

(22) Filed: Feb. 17, 2000

Related U.S. Application Data

(60) Provisional application No. 60/130,308, filed on Apr. 21, 1999.

(51) Int. Cl.[7] .............................. G11B 33/08; G11B 5/62
(52) U.S. Cl. ..................................... 360/97.02; 360/135
(58) Field of Search ........................ 360/97.01–98.01, 360/135, 133

(56) References Cited

U.S. PATENT DOCUMENTS

| | | | | |
|---|---|---|---|---|
| 3,579,817 A | * | 5/1971 | Boyle ........................... | 29/588 |
| 4,264,551 A | * | 4/1981 | Oonishi et al. ............. | 264/107 |
| 5,214,549 A | | 5/1993 | Baker et al. ............. | 360/97.02 |
| 5,258,972 A | | 11/1993 | Brasfield et al. ............. | 369/270 |
| 5,272,581 A | * | 12/1993 | Kojima et al. ........... | 360/98.01 |
| 5,458,940 A | | 10/1995 | Woo ........................... | 428/64.3 |
| 5,474,840 A | | 12/1995 | Landin ........................ | 428/294 |
| 5,482,000 A | * | 1/1996 | Ward ........................... | 116/217 |
| 5,510,168 A | * | 4/1996 | Mori et al. ................... | 428/141 |
| 5,538,774 A | | 7/1996 | Landin et al. ............. | 428/64.1 |
| 5,569,506 A | | 10/1996 | Jahnes et al. ............... | 428/65.3 |
| 5,594,607 A | | 1/1997 | Erpelding et al. .......... | 360/104 |
| 5,663,851 A | | 9/1997 | Jeong et al. ............. | 360/98.08 |
| 5,666,239 A | | 9/1997 | Pottebaum ............... | 360/97.03 |
| 5,725,931 A | | 3/1998 | Landin et al. ............. | 428/134 |
| 5,760,768 A | | 6/1998 | Gram .......................... | 345/333 |
| 5,834,864 A | * | 11/1998 | Hesterman et al. ... | 310/40 MM |
| 5,863,664 A | | 1/1999 | McCormick et al. ....... | 428/500 |
| 6,215,617 B1 | * | 4/2001 | Okumura et al. ........ | 360/99.12 |
| 6,225,801 B1 | * | 5/2001 | Jin et al. .................... | 324/252 |

\* cited by examiner

*Primary Examiner*—Jefferson Evans
(74) *Attorney, Agent, or Firm*—Paul J. Prendergast; Merchant & Gould P.C.

(57) ABSTRACT

An apparatus and method for reducing structural vibrations in a disc drive that incorporates a fusible alloy. A fusible alloy portion is constrained between a first and second structural alloy portion through conventional lamination techniques. A fusible alloy can be incorporated into any structural component of the disc drive, including a base plate and an information storage disc. Fusible alloys incorporated into the disc drive absorb energy transmitted by vibrations through anelastic deformation, i.e., through dislocation motion. Suitable fusible alloy materials may include but are not limited to: Lead-Tin, Indium-Tin and Indium-Bismuth.

14 Claims, 4 Drawing Sheets

APPARATUS AND METHOD FOR REDUCING STRUCTURAL VIBRATIONS IN A DISC DRIVE UTILIZING FUSIBLE ALLOYS

RELATED APPLICATIONS

This application claims the benefit of priority of United States Provisional Patent Application Ser. No. 60/130,308 entitled "DISC DRIVE USING FUSIBLE ALLOY LAMINATIONS," filed Apr. 21, 1999.

FIELD OF THE INVENTION

This application relates to magnetic disc drives and more particularly to a disc drive having a component or components that incorporate a laminate damping material.

BACKGROUND OF THE INVENTION

Disc drives are data storage devices that store digital data in magnetic form on a rotating storage medium on a disc. Modern disc drives comprise one or more rigid discs that are coated with a magnetizable medium and mounted on the hub of a spindle motor for rotation at a constant high speed. Information is stored on the discs in a plurality of concentric circular tracks typically by an array of transducers ("heads") mounted to a radial actuator for movement of the heads relative to the discs. Each of the concentric tracks is generally divided into a plurality of separately addressable data sectors. The read/write transducer, e.g. a magnetoresistive read/write head, is used to transfer data between a desired track and an external environment. During a write operation, data is written onto the disc track and during a read operation the head senses the data previously written on the disc track and transfers the information to the external environment. During either the read or write operation it is imperative that the head maintain a centered position within the desired track. An off-centered head will have lower overall reliability where the head has a higher likelihood of improperly performing the reading and writing operations.

Critical to maintaining proper head positioning within the center of a concentrically circular track is minimizing structural vibrations within the disc drive, especially vibrations that effect the stability of the information storage discs. Structural vibrations are introduced into the disc of a disc drive by such normal operating conditions as the rotation of the spindle motor, air turbulence around the outer diameter of the rotating discs and by other normal events that can cause pulse forces to transmit to the disc or originate at the disc. Additionally, non-operational vibrations may also be introduced to the disc by shock events like dropping or kicking the computer. In either case, normal operating conditions or shock events, a need exists to minimize structural vibrations in the disc so as to maintain the integrity of the head position at the center of a desired track.

Conventionally, discs are typically produced from stamped aluminum alloy substrate. Aluminum alloy as a disc substrate is cost effective, clean and facilitates ease of manufacture. However, aluminum alloys, like most structural metal alloys, exhibits negligible properties for limiting or damping structural vibrations. Two possible solutions for damping structural vibrations within a disc are to use an extrinsic damping material on the disc or to incorporate an intrinsic damping material within the disc.

An external damping material could be used to dampen structural vibrations within the metal components of a disc drive. This solution would require proper spacing to be maintained throughout the disc drive as well as effective positioning of the material on the relevant components.

An alternative solution to extrinsic damping is to intrinsically dampen the information storage disc. The industry standard for intrinsically damping information storage disc substrates is to adhere or laminate viscoelastic polymeric materials with the aluminum alloy substrate. This method of intrinsically damping the disc substrate, however, has several key shortcomings, including: (1) the adhered polymers tend to creep under the centrifugal acceleration forces of the rotating spindle. The creeping polymer tends to introduce variations in the thickness of the disc and, as a result, introduce surface distortions that have an adverse effect on the reliability in the read and write operations in the disc drive; and (2) adhesives and polymers tend to "outgas" over time and with use. Outgassing is a major concern of the disc drive industry, as outgassing tends to accelerate the rate of generation of corrosion products within the disc drive assembly. Further, outgassed hydrocarbons tend to build-up on the head and disc surfaces and can interfere with the head flying over the disc surface.

Accordingly, there is a need for a damped disc substrate that avoids the added cost and complexity of extrinsic damping materials and avoids the shortcomings of current intrinsic damping materials, yet absorbs the energy of structural vibrations and enhances overall disc drive reliability. Note also, that although the proceeding example focused on aluminum based information storage disc substrates, the same need exists for dampening structural vibrations within any of the structural components of the disc drive assembly.

SUMMARY OF THE INVENTION

Against this backdrop the present invention has been developed. The present invention is a structural component of a disc drive that incorporates a fusible alloy portion to dampen structural vibrations in the disc drive.

In accordance with the preferred embodiment of the present invention, a damped structural component in a disc drive includes a first structural alloy portion, a second structural alloy portion and a fusible alloy portion. The fusible alloy portion is sandwiched between the first and second structural alloy portions to operatively dampen structural vibrations felt by the structural component. The structural component may be an information storage disc, base plate or any structural component found within the disc drive.

The present invention can further be implemented as a method for reducing structural vibrations in a structural component of a disc drive. The method includes the steps of providing a first structural component portion, providing a second structural component portion, sandwiching a fusible alloy portion between the first and second structural component portions and joining together the first structural component portion, the fusible alloy portion and the second structural component portion.

These and various other features as well as advantages which characterize the present invention will be apparent from a reading of the following detailed description and a review of the associated drawings.

DETAILED DESCRIPTION

Figure 1:
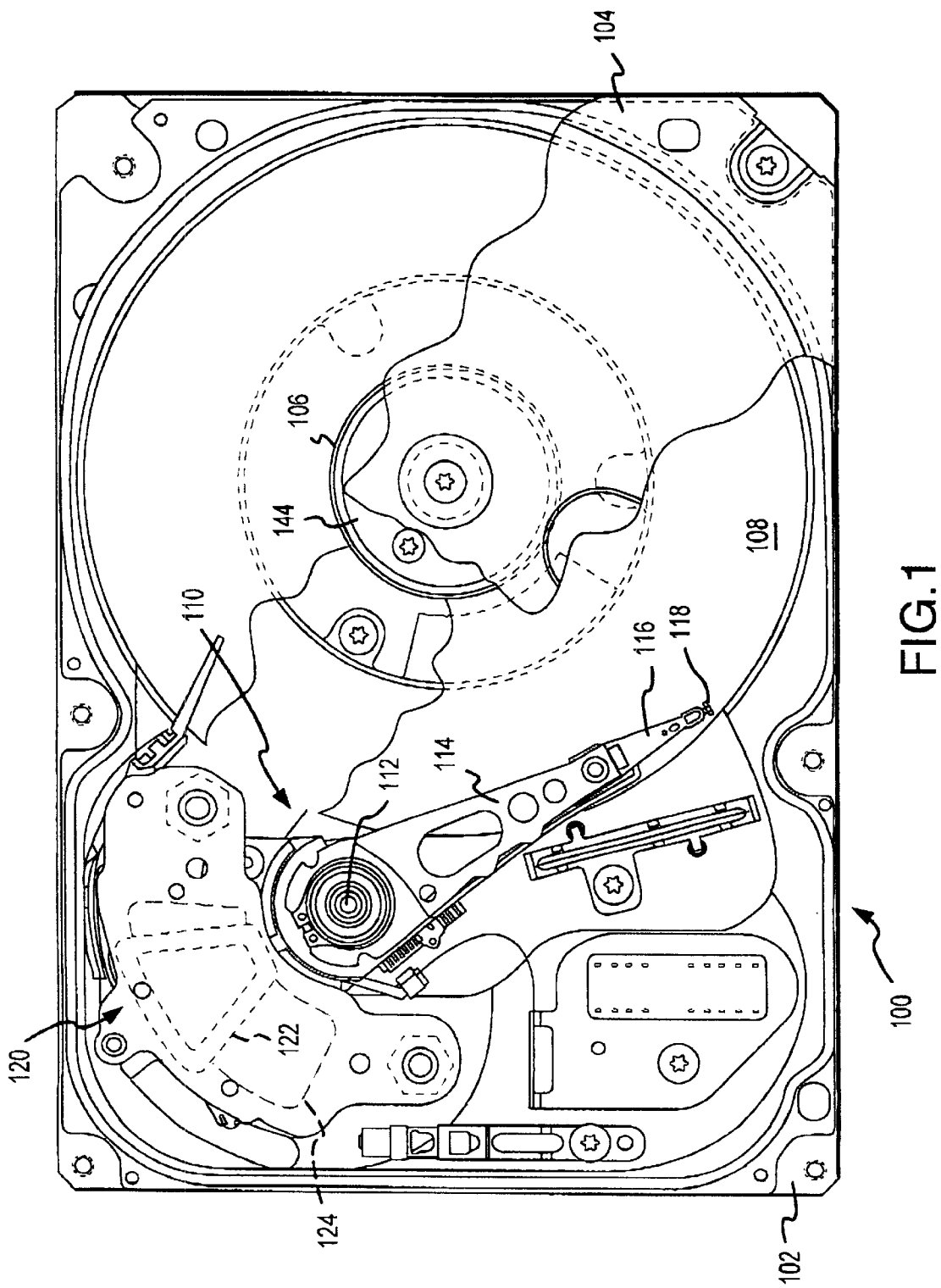
FIG. 1 is a plan view of a disc drive incorporating a fusible alloy portion in accordance with a preferred embodiment of the present invention.

A disc drive 100 constructed in accordance with a preferred embodiment of the present invention is shown in FIG. 1. The disc drive 100 includes a base plate 102 to which various structural components of the disc drive 100 are mounted. A top cover 104, shown partially cut away, cooperates with the base 102 to form an internal, sealed environment for the disc drive in a conventional manner. The components include a spindle motor 106 which rotates one or more information disclosure discs 108 at a constant high speed. Information is written to and read from tracks on the information storage discs 108 through the use of an actuator assembly 110, which rotates about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

The radial position of the heads 118 is controlled through the use of a voice coil motor (VCM) 120, which typically includes a coil 122 attached to the actuator assembly 110, as well as one or more permanent magnets 124 which establish a magnetic field in which the coil 122 is immersed. The controlled application of current to the coil 122 causes magnetic interaction between the permanent magnets 124 and the coil 122 so that the coil 122 moves in accordance with the well known Lorentz relationship. As the coil 122 moves, the actuator assembly 110 pivots about the bearing shaft assembly 112 and the heads 118 are caused to move across the surfaces of the discs 108.

The discs 108 are rotated at a constant high speed by a spindle control circuit, which typically electrically communicates with the spindle motor 106 through the use of back electromotive force (BEMF) sensing. The radial position of the heads 118 is controlled through the application of current to the coil 122 of the actuator assembly 110.

Positioning of the head 118 within a desired track, and keeping the head 118 maintained at that position, is of critical importance for the proper functioning of the disc drive 100. As such, structural vibrations generated during normal disc drive operation, or when the disc drive is subjected to an external shock load, can have detrimental effects on head-track positioning. The present invention is directed to minimizing propagation of structural vibrations caused by the disc drive 100 during normal operations and toward minimizing the effects of shock events on the disc drive 100.

Figure 2:
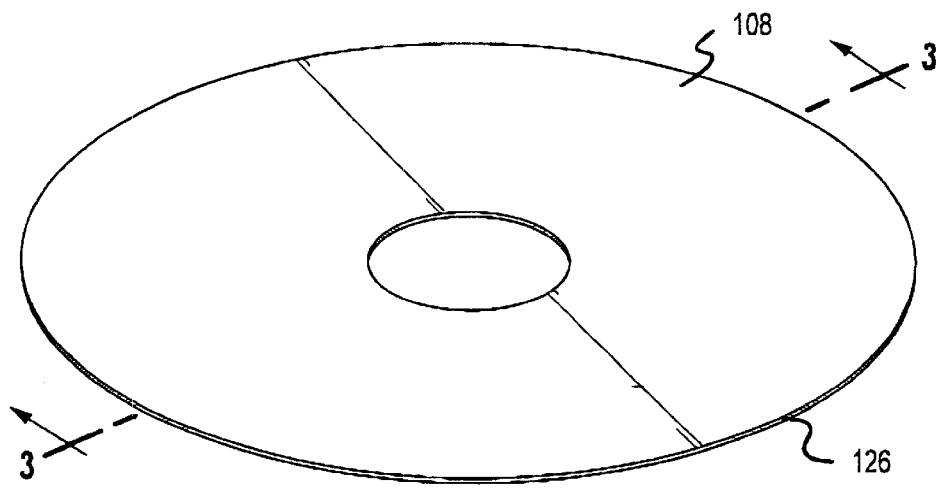
FIG. 2 illustrates a perspective separate view of an information storage disc having a substrate incorporating the fusible alloy portion of the present invention.

FIG. 2 shows a perspective separate view of an information storage disc 108 having a substrate incorporating the fusible alloy portion 126 of the present invention. Information storage discs 108 are an ideal targets for the introduction of a fusible alloy, as information storage discs 108 are particularly likely to vibrate under normal disc drive operating conditions and because information storage disc carry the concentrically circular tracks on which the head 118 is positioned and thus must be stable for proper head reading and writing operations. Potential information storage disc 108 structural alloy substrates include, but are not limited to: aluminum, aluminum alloys, metal matrix composites, vinyl, and ceramic materials, e.g., glass, AlBC, Sapphire and $Al_2O_3$.

Figure 3:
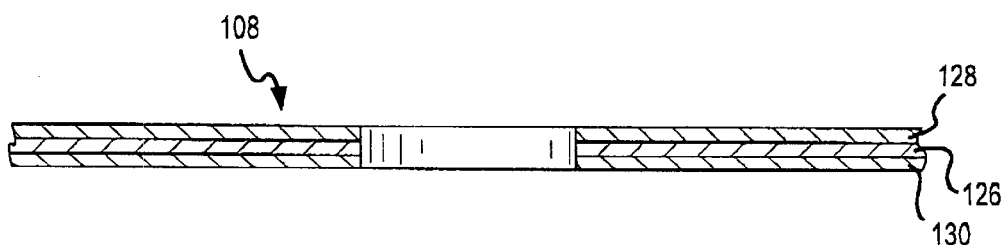
FIG. 3 is a sectional view taken along 3—3 of FIG. 2.

FIG. 3 is a cross section taken along line 3—3 of FIG. 2 illustrating one possible arrangement for the fusible alloy portion 126 within an information storage disc 108. The fusible alloy portion 126 is formed and constrained between a first portion and second portion of structural alloy substrate 128 and 130 respectively. The structural alloy portions 128 and 130 are stiffer than the fusible alloy portion 126 and act to constrain the fusible alloy. The combination of a fusible alloy portion between two structural alloy portions forms a fusible alloy "constrained layer" which acts as a damper of structural vibrations. Preferably, the structural alloy portions are in direct and intimate contact with the fusible alloy portion to maximize the ability of the fusible alloy to absorb structural vibrations. Additionally, due to shear forces acting on the structural components of the disc drive, the fusible alloy portion is preferably positioned as the middle portion between the two structural alloy portions. Note, however, that the fusible alloy portion may be positioned as the top, bottom or any portion in-between with regard to the structural alloy portions.

With regard to thickness of each portion, structural and fusible, it should be understood that the portions can be of equal thickness. However, it should also be understood that varying the thickness of each portion is within the scope of the present invention, so that the fusible alloy layer can be half or quarter or other fraction of the structural component portion. Additionally, under some circumstances it may be beneficial to have the fusible alloy portion of a greater thickness than either of the structural component portions and that also is within the scope of the present invention.

The two structural alloy portions 128 and 130 and the fusible alloy portion 126 are preferably joined together utilizing conventional lamination techniques, however, it should be understood that alternative methods of joining, such as with adhesives, could be used.

Fusible alloys represent a special class of metals having low melting temperatures, often as low as 70° C. As borne out by the low melting temperatures, the microstructure of fusible alloys is easily changed by the introduction of energy. Fusible alloys are able to absorb vibrational energy by anelastic deformation, i.e., through dislocation motion. Note, that structural alloy substrates have higher melting points and greater microstructure stability and are thus poor dampers of vibrational energy. Suitable fusible alloy materials for use in an information storage disc of the present invention include but are not limited to: Lead-Tin, Indium, Indium-Tin and Indium-Bismuth.

The fusible alloy may be a continuous layer of fusible alloy substrate or may be a discontinuous layer of fusible alloy substrate in combination with other damping material or other structural alloys forming part of the layer. Further, it should also be understood that the present invention discloses a fusible alloy mixed with a structural alloy to produce hybrid alloys having damped and structural characteristics. The hybrid alloys have fusible alloy molecules integrated within the structural alloy matrix for absorbing vibrational energy.

Figure 4:
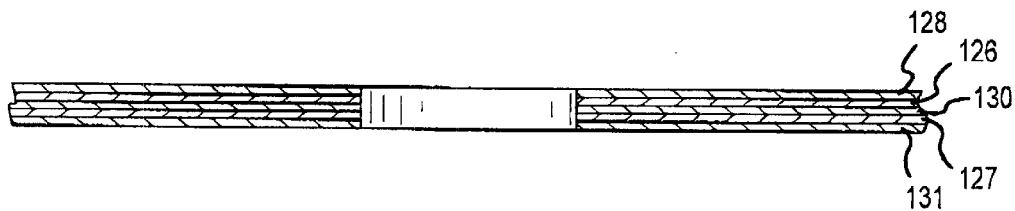
FIG. 4 is an alternative sectional view taken along 3—3 of FIG. 2.

FIG. 4 shows an alternative configuration for the laminate cross section shown in FIG. 3. Two layers of fusible alloy 126 and 127 are interposed between three layers of structural alloy 128, 130 and 131, where the five layers 126, 127, 128, 130 and 131 alternate structural alloy/fusible alloy starting with a structural layer on top 128 and ending with a structural layer on bottom 131. It is understood that the scope of the present invention includes other multiple combinations of structural alloy/fusible alloy layers arranged in alternating fashion. However, the embodiment described in FIG. 3, having three layers total (two structural and one damping), is preferred.

Figure 5:
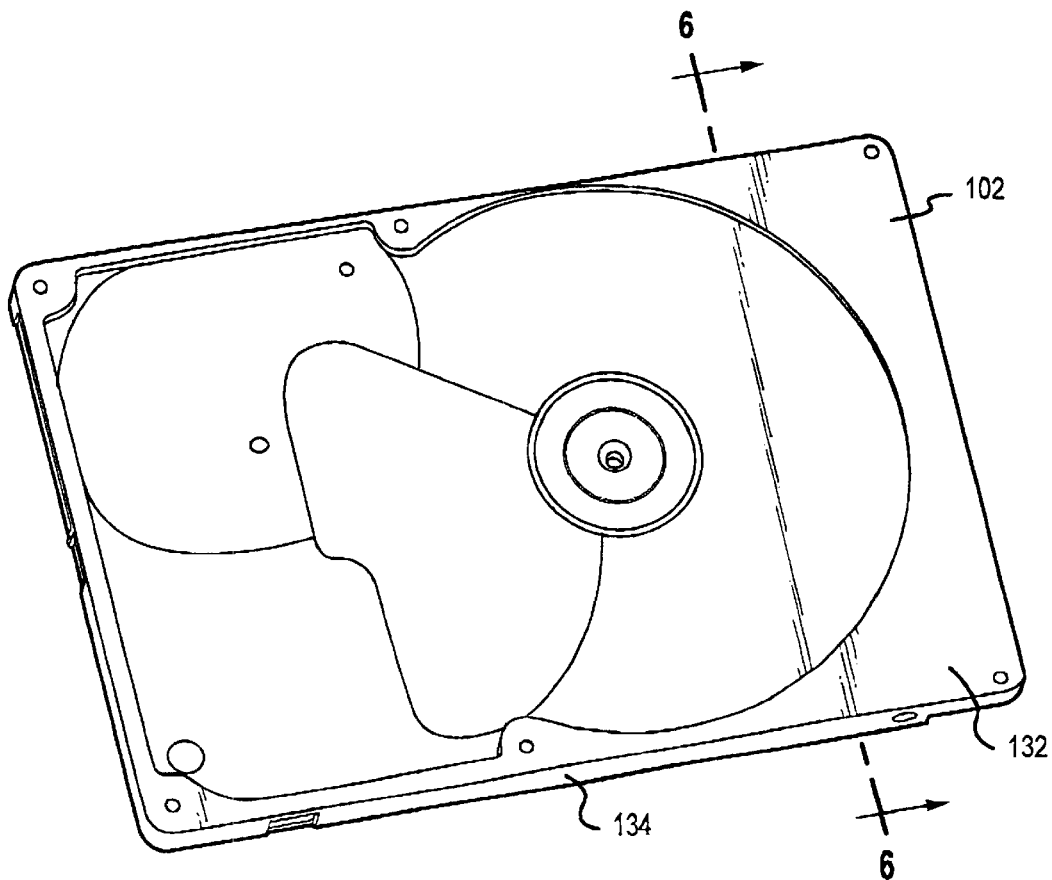
FIG. 5 illustrates a perspective separate view of a disc drive base plate incorporating the fusible alloy portion in accordance with the present invention.

FIG. 5 illustrates a perspective separate view of a base plate 102 having a substrate incorporating the fusible alloy laminations in accordance with the teachings of the present invention. The base plate 102 has a flat rectangular shaped platform portion 132 supported on a downwardly extending peripheral ring 134. As noted above, the base plate platform portion 132 acts to support the various components of the disc drive 100 and, as such, is preferably free of structural vibrations. The base plate fusible alloy portion 136 (FIG. 5) is directed toward minimizing the vibrational effects of normal disc drive operations and for shock load events that propagate through the computer to the disc drive.

Figure 6:
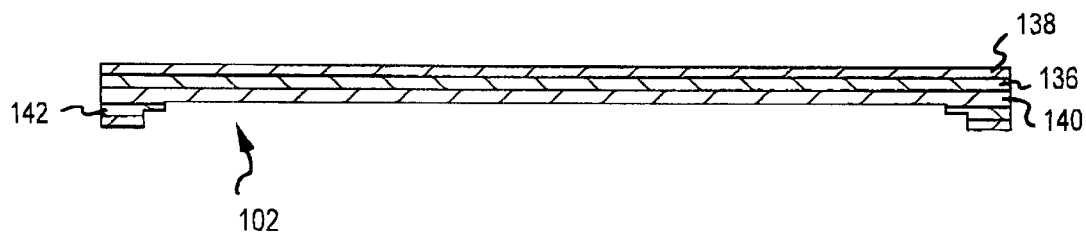
FIG. 6 is a sectional view taken along 5—5 of FIG. 4.

FIG. 6 is a cross section taken along line 6—6 of FIG. 4 illustrating one possible arrangement for the fusible alloy portion 136 in the base plate 102. With regard to the platform portion 132, the fusible alloy portion is constrained between a first portion and second portion of structural alloy substrate 138 and 140 respectively. As discussed in relation to FIG. 3, the structural alloy portions 138 and 140 are stiffer than the fusible alloy portion 136 and act to constrain the fusible alloy to form a "constrained layer" damper. Preferably, the structural alloy portions are in direct and intimate contact with the fusible alloy portion to maximize the ability of the fusible alloy to absorb structural vibrations. Additionally, since constrained layer dampers operate best under shear, the fusible alloy portion is preferably positioned as the middle portion between the two structural alloy portions in the base plate. However, as discussed above, it should be understood that the fusible alloy portion positioned as the top, bottom or any portion between, is within the scope of the present invention. Potential base plate structural alloy substrates include, but are not limited to: aluminum, aluminum alloys, stainless steel, glass and plastics.

As above, the fusible alloy portion 136 may be a continuous layer of fusible alloy substrate or may be a discontinuous layer of fusible alloy substrate in combination with other damping material or other structural alloys. Additionally, as discussed above in relation to the information storage disc, it is further envisioned that the fusible alloy not necessarily be laminar but could be integrated into the overall alloy composition of the base plate 102. Suitable fusible alloy materials for use in the platform portion of the base plate may include but are not limited to: Lead-Tin, Indium, Indium-Tin and Indium-Bismuth. It is also envisioned that the peripheral ring portion of the base plate may incorporate a fusible alloy portion 142.

Although preferred embodiments are shown in FIGS. 2–6, it should be understood that this type of laminated fusible alloy may be incorporated into other disc drive structural components. Disc drive structural components are generally considered, for purposes of this invention, any component of the disc drive 100 that is rigid and capable of transmitting a vibration. These structural components may include but are not limited to: the top cover 104 (FIG. 1), VCM assembly 120 (FIG. 1), spindle motor 106, spindle motor sleeves (not shown), spindle motor shafts and bases (not shown), disc clamp 144 (FIG. 1), disc spacer (not shown), magnetic latches (not shown), disc snubbers (not shown), head suspension parts (not shown), head load ramp (not shown) and head unload ramp (not shown).

Accordingly, the present invention provides a class of fusible alloys that intrinsically dampen the structural components of the disc drive 100. Fusible alloys intrinsically dampen structural vibrations by absorbing energy delivered to the alloy in an anelastic manner. Thus, when a vibration propagates through a disc drive component incorporating the fusible alloy layer the amplitude of the vibration decreases as the energy is absorbed by the alloy, the absorbed energy going to deforms the alloy microstructure. Deformations within the alloy are random, as the fusible alloy will not return to its original structure upon absorbing the energy from the surrounding environment.

The present invention will be more fully understood with reference to the following example, noting that the example is not meant to limit the scope of the invention, but rather to illustrate the benefits of the fusible alloy.

EXAMPLE

An information storage disc was produced having a central Indium alloy layer laminated with 5052 aluminum alloy. Solder flux was applied to the bonding surfaces of the Aluminum substrates, and heat and pressure applied to consolidate the laminate. The Indium alloy layer was approximately 0.002 inches thick and placed at the neutral axis of the disc. The resulting disc substrate was compared to a conventional 5052 aluminum substrate disc for intrinsic dampening properties. Each disc was placed on an axial shaker using a specifically designed fixture, and operating frequencies were explored in the range of 10 to 1000 Hz, while maintaining normal disc drive operating temperatures. Data from the axial shaker was inputted into a Shaker3D program, a program designed for the HP Dynamic Signal Analyzer, to resolve the natural frequency and to fit an ideal curve to the data to determine dampening. The results indicate an approximate four fold increase in the dampening properties of the information storage disc incorporating the central Indium alloy layer as compared to the conventional 5052 aluminum substrate disc.

This data shows that information storage disc that incorporate a layer of fusible alloy result in significant dampening of structural vibrations at normal disc drive operating temperatures and frequencies.

Figure 7:
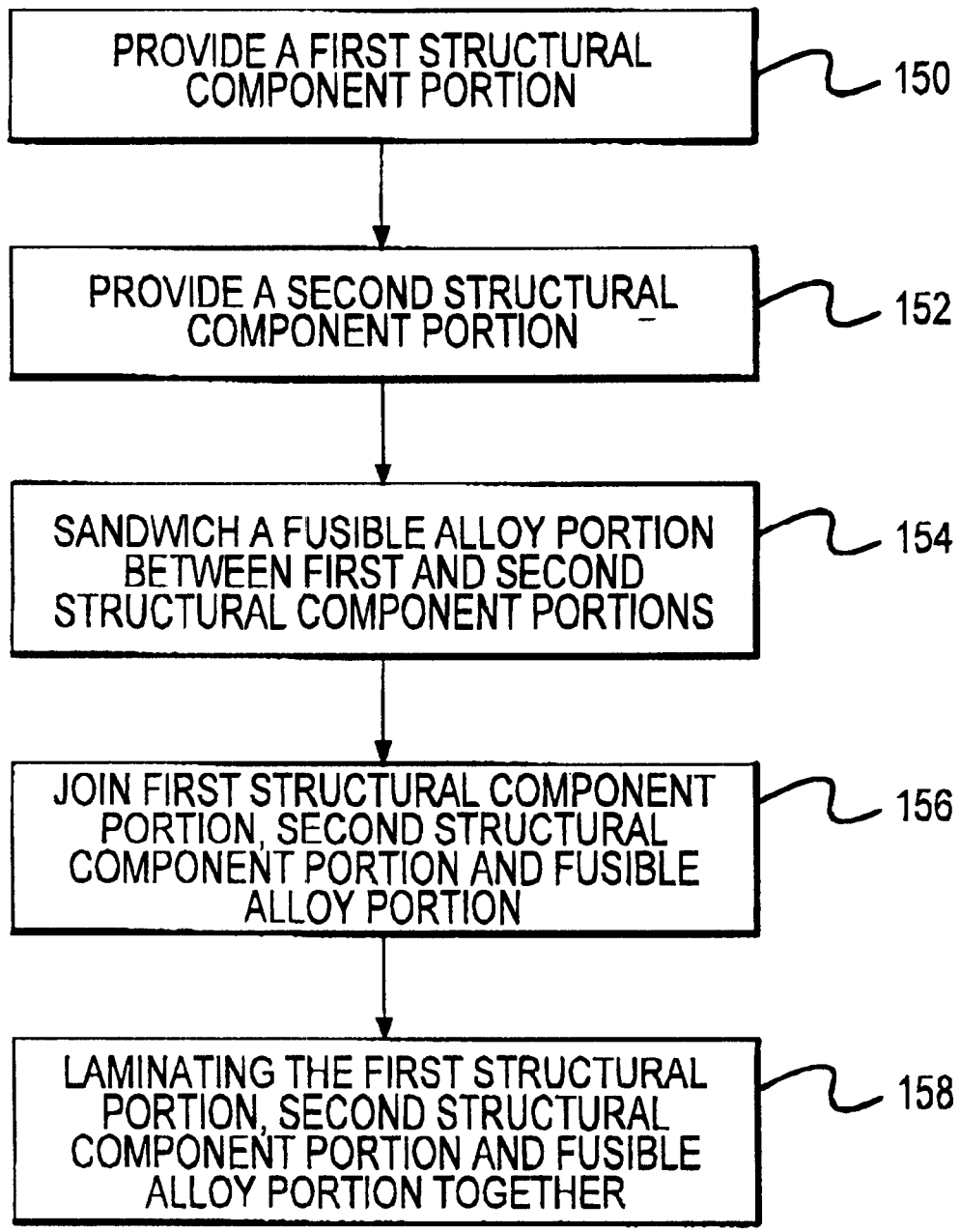
FIG. 7 is a flow chart of the method for reducing structural vibrations in a structural component in the disc drive in accordance with a preferred embodiment of the present invention.

A method for reducing the effects of structural vibrations in a disc drive structural component is shown in FIG. 7. FIG. 7 is for illustrative purposes and shows a structural component having one fusible alloy portion and two structural alloy portions. It should be understood that the present inventive method encompasses the joining of one or more fusible alloy portions and two or more structural component portions.

In operation 150, a first structural component portion is provided. In operation 152, a second structural component portion is provided. In operation 154 a fusible alloy portion is sandwiched between the first and second structural component portions. In operation 156 the first structural component portion, second structural component portion and fusible alloy portion are joined. Finally in operation 158, the three layers are laminated together.

In summary, the present invention is a disc drive structural component (such as 102, 104, 106, 108, 120 or 144) utilizing a fusible alloy for reducing the effects of structural vibrations in a disc drive (such as 100). The damped structural component (such as 102, 104, 106, 108, 120 or 144) of the disc drive (such as 100) includes a first structural portion (such as 128 or 138), a second structural portion (such as 130 or 140), and a fusible alloy portion (such as 126 or 136) sandwiched between the first and second structural alloy portions to operatively dampen the effects of structural vibrations. The first and second structural portions may be stiffer than the fusible alloy portion. The fusible alloy portion (such as 126 or 136) may be selected from the group of Lead-Tin, Indium, Indium-Tin or Indium-Bismuth and may be a continuous layer or a discontinuous layer. The damped structural component could be an information storage disc (such as 108) or a base plate (such as 102).

A third structural portion (such as 131) and second fusible alloy portion (such as 127) may be incorporated into the structural component of the disc drive. Here, the first fusible alloy portion (such as 126) is sandwiched between the first and second structural portions (such as 128 and 130) and the second fusible alloy portion (such as 127) is sandwiched between the second and third structural portions (such as 130 and 131).

The present invention is also a method for reducing the effects of structural vibrations in a structural component (such as 102, 104, 106, 108, 120 or 144) of the disc drive (such as 100). The method includes the steps of providing a first structural component portion (such as step 150), providing a second structural component portion (such as step 152), sandwiching a fusible alloy portion between the first structural component portion and the second structural component portion (such as step 154) and joining together the first structural component portion, second structural component portion and fusible alloy portion (such as step 156). The method may further include laminating the first structural component portion, second structural component portion and fusible alloy portion together (such as step 158).

It will be clear that the present invention is well adapted to attain the ends and advantages mentioned as well as those inherent therein. While a presently preferred embodiment has been described for purposes of this disclosure, numerous changes may be made with will readily suggest themselves to those skilled in the art. Accordingly, all such modifications, changes and alternatives are encompassed in the spirit of the invention disclosed and as defined in the appended claims.

What is claimed is:

1. A damped structural component in a disc drive, comprising:

a first structural portion;

a second structural portion; and a fusible alloy portion sandwiched between the first and second structural portions operatively dampening the effects of structural vibrations;

wherein the damped structural component is a base plate for use in a disc drive.

2. The damped structural component of claim 1 further comprising:

a third structural portion; and a second fusible alloy portion, wherein the first fusible alloy portion is sandwiched between the first and second structural portions and the second fusible alloy portion is sandwiched between the second and third structural portions.

3. The damped structural component of claim 1, wherein the first and second structural portions are stiffer than the fusible alloy portion.

4. The damped structural component of claim 1, wherein the fusible alloy is selected from the group consisting essentially of Lead-Tin, Indium, Indium-Tin and Indium-Bismuth.

5. A damped structural component in a disc drive, comprising:

a first structural portion;

a second structural portion; and a fusible alloy portion sandwiched between the first and second structural portions operatively dampening the effects of structural vibrations, wherein the fusible alloy portion is discontinuous.

6. The damped structural component of claim 5, wherein the damped structural component is an information storage disc for use in a disc drive.

7. A damped structural component in a disc drive for reducing the effects of structural vibration in the disc drive, comprising:

a disc drive spindle motor secured to a base plate, the disc drive spindle motor having an information storage disc secured to the disc drive spindle motor; and means for damping vibrations within the structural component and for bonding the structural component.

8. A damped structural component in a disc drive, comprising:

a first structural portion;

a second structural portion; and a fusible alloy portion sandwiched between the first and second structural portions bonding the first and second structural portions together and operatively dampening the effects of structural vibrations.

9. The damped structural component of claim 8, wherein the first and second structural portions are stiffer than the fusible alloy portion.

10. The damped structural component of claim 8, wherein the fusible alloy is selected from the group consisting essentially of Lead-Tin, Indium, Indium-Tin and Indium-Bismuth.

11. The damped structural component of claim 8, wherein the fusible alloy portion is discontinuous.

12. The damped structural component of claim 8, wherein the damped structural component is an information storage disc for use in a disc drive.

13. The damped structural component of claim 8, wherein the damped structural component is a base plate for use in a disc drive.

14. The damped structural component of claim 8, further comprising:

a third structural portion; and a second fusible alloy portion, wherein the first fusible alloy portion is sandwiched between the first and second structural portions and the second fusible alloy portion is sandwiched between the second and third structural portions.

* * * * *